United States Patent
Bohm et al.

(10) Patent No.: US 6,926,969 B2
(45) Date of Patent: Aug. 9, 2005

(54) PROCESS FOR THE PRODUCTION OF SINTERED POROUS BODIES

(75) Inventors: Alexander Bohm, Hanichen (DE); Hartmut Gohler, Dresden (DE); Dirk Naumann, Mississauga (CA)

(73) Assignees: Inco Limited, Toronto (CA); Fraunhofer-Gesellschaft zur Forderung der angewandten Forschung e. V., Munich (DE)

(*) Notice: Subject to any disclaimer, the term of this patent is extended or adjusted under 35 U.S.C. 154(b) by 142 days.

(21) Appl. No.: 10/473,093

(22) PCT Filed: Oct. 4, 2002

(86) PCT No.: PCT/EP02/11111

§ 371 (c)(1),
(2), (4) Date: Sep. 22, 2003

(87) PCT Pub. No.: WO03/033192

PCT Pub. Date: Apr. 24, 2003

(65) Prior Publication Data

US 2004/0101706 A1 May 27, 2004

(30) Foreign Application Priority Data

Oct. 11, 2001 (DE) .......................... 101 50 948

(51) Int. Cl.$^7$ .............................. B22F 3/11; B22F 7/00; B22F 9/04; B32B 5/18; B32B 5/16
(52) U.S. Cl. .................. 428/566; 428/550; 428/551; 428/613; 419/2; 419/6; 419/45; 419/46; 419/61
(58) Field of Search ...................... 428/566, 550, 428/551, 613; 419/2, 6, 45, 46, 61

(56) References Cited

U.S. PATENT DOCUMENTS

| | | | |
|---|---|---|---|
| 3,831,258 A | * 8/1974 | Elbert et al. ................ 428/592 |
| 3,950,460 A | 4/1976 | Mastrangelo et al. ......... 264/44 |
| 4,155,755 A | * 5/1979 | Sara ........................... 148/514 |
| 4,251,272 A | 2/1981 | Sara ........................... 75/200 |
| 4,624,941 A | * 11/1986 | Berndt et al. ............... 502/302 |
| 5,582,867 A | * 12/1996 | Tsubouchi et al. .......... 427/253 |
| 5,672,387 A | * 9/1997 | Tsubouchi et al. .......... 427/253 |
| 5,858,056 A | * 1/1999 | Fujine et al. ................ 75/236 |
| 5,951,791 A | 9/1999 | Bell et al. ................... 148/518 |
| 5,967,400 A | 10/1999 | Bell et al. ................. 228/124.5 |
| 6,071,650 A | * 6/2000 | Harada et al. .............. 429/235 |
| 6,117,341 A | * 9/2000 | Bray et al. .................. 210/791 |
| 6,387,149 B1 | * 5/2002 | Harada et al. ............... 75/239 |
| 6,436,163 B1 | * 8/2002 | Geibel et al. ................ 55/523 |
| 6,849,361 B2 | * 2/2005 | Fukuda et al. .............. 429/235 |

FOREIGN PATENT DOCUMENTS

| | | |
|---|---|---|
| DE | 44 18 598 C2 | 11/1995 |
| DE | 197 22 416 A1 | 5/1997 |
| JP | 8020831 | 1/1996 |
| WO | 9533079 | 12/1995 |
| WO | 95/33079 | * 12/1995 |

* cited by examiner

*Primary Examiner*—Deborah Jones
*Assistant Examiner*—Jason L Savage
(74) *Attorney, Agent, or Firm*—Edward A. Steen

(57) ABSTRACT

The invention relates to a process for the production of sintered porous bodies, to porous bodies produced correspondingly using the process, and to their use. With the solution according to the invention, sintered bodies which achieve improved properties, such as an increased surface area, deformability of the structures at room temperature or modification of the initial pore volume, are to be produced. To this end, at least one sintering-active powder which forms at least one intermetallic phase or mixed crystals is applied to the surface of a porous basic body. Heat treatment is to be carried out subsequently, in which intermetallic phases or mixed crystals which increase the specific surface area can be formed.

38 Claims, No Drawings

PROCESS FOR THE PRODUCTION OF SINTERED POROUS BODIES

The invention relates to a process for the production of sintered porous bodies and to porous bodies produced by the process and to their use.

Porous bodies of this type can, in contrast to metal foams which are known per se, also be employed at elevated temperatures, even up to above 1800° C., which is also desired for use as filters or catalyst supports for various applications.

In addition, the foams or bodies produced using the known processes only meet the requirements regarding the achievable specific surface areas to a limited extent, and production is likewise frequently expensive as a consequence of the technology.

Bodies or elements of this type are also desired for use as lightweight thermal insulation elements, where upper temperature limits and chemically aggressive, corrosion-promoting ambient conditions frequently prevent use.

In order to counter these disadvantages, it has been described, for example in U.S. Pat. Nos. 5,951,791 and 5,967,400, how a nickel foam can be coated on the surface with nickel aluminide by means of PVD or CVD processes which are known per se. However, these coating processes set limits with regard to the achievable penetration depth into the porous foam structure, are associated with considerable costs, and a significant increase in surface area and acceptable deposition rates with which corresponding layer thicknesses of nickel aluminide are attained generally cannot be achieved.

The object of the invention is therefore to propose a process for the production of sintered porous bodies which achieve improved properties, such as an increased surface area of such bodies, deformability of the structures at room temperature or modification of the initial pore volume.

This object is achieved in accordance with the invention by means of a process having the features described in the claims. Advantageous embodiments and refinements of the invention can be achieved with the features mentioned in the sub-claims.

A sintered porous body produced in accordance with the invention has intermetallic phases or mixed crystals in surface regions, i.e. also within the pore structure, or is formed entirely of these intermetallic phases or mixed crystals. In the former case, it is not necessary to coat the entire surface with intermetallic phases or mixed crystals. It is also possible for certain surface regions to be selected and correspondingly modified in a targeted manner, enabling chemical and physical properties also to be correspondingly influenced locally.

The porosity is essentially determined by a porous basic body likewise used in the production which serves as support for the elements forming the intermetallic phases or mixed crystals. For this purpose, elements forming intermetallic phases or mixed crystals are applied to and introduced into the structure, as will be explained in greater detail below, and the phases or mixed crystals are formed by means of heat treatment, with the pore size generally being reduced compared with the initial pore size of the basic structure used in each case, but the overall effective surface area is increased.

The porosity of the bodies is in the range from 70 to 99.5% of the theoretical density.

The intermetallic phases or mixed crystals can be formed from at least two elements selected from nickel, iron, titanium, cobalt, aluminum, copper, silicon, molybdenum or tungsten. However, preference is given to aluminides or silicides, with nickel aluminides being particularly preferred. Thus, for example, nickel aluminide can be formed on a porous nickel basic structure, it being possible for the nickel basic structure to form a ductile core. These elements can be employed as powders, and the intermetallic phase or the mixed crystals can then be formed with the basic body material. However, it is also possible to employ powder mixtures with elements which form phases or crystals of this type. A powder mixture may also additionally comprise elements which form alloys (for example Cr, Ta, Nb, Bi, Sn or Zn) in an amount of up to 20% by weight.

The increased surface area of these porous bodies enables them to achieve an improved filter action or be advantageously employed with additional elements or substances acting as catalyst, it being possible to fall back on ones that are known per se, such as, for example, platinum or rhodium. Increased thermal stability also facilitates applications which were hitherto impossible.

The strength and thermal behavior can furthermore be improved if in addition reinforcing components are integrated into a porous body or embedded in a surface coating. Reinforcing components of this type are, for example, SiC, $ZrO_2$, $Al_2O_3$, $TiB_2$ and/or $HfO_2$. These can be applied with the components forming intermetallic phases or mixed crystals before the heat treatment or alternatively formed reactively before, during or after the heat treatment for the formation of the intermetallic phases or mixed crystals. In this way, it is also possible to incorporate functional components, which influence, for example, the oxidation behavior.

A porous body according to the invention may have a single intermetallic phase or alternatively more than one intermetallic phase or one or more different mixed crystals.

A possible procedure in the production is that a suspension/dispersion comprising at least sintering-active powder which forms an intermetallic phase or a mixed crystal is applied to a porous basic body. The reaction for the formation of the intermetallic phases or the mixed crystals can be carried out later between the powders of the dispersion with one another or between the powder and the basic substrate. This can be followed by drying, which can in turn be followed by heat treatment for the formation of at least one intermetallic phase or mixed-crystal form, with a possible increase in the specific surface area being carried out at the same time. The heat treatment should always be carried out at temperatures which are suitable for the sintering of a powder or powder mixture.

The suspension/dispersion may additionally comprise organic and/or inorganic binders. In the case where the suspension/dispersion comprises an organic binder and/or a basic body comprising an organic porous material, for example melamine or PUR foam has been used, the organic constituents should be expelled before this heat treatment, which can readily be achieved by means of interim heating (pyrolysis) at temperatures not exceeding 750° C. and generally below.

Particularly sintering-active powders or powder mixtures comprising elements which form intermetallic phases (for example nickel and aluminum) enable a significant lowering of the requisite sintering temperatures, enabling intermetallic phases of elements which actually require significantly higher sintering temperatures also to be obtained on porous bodies produced in accordance with the invention. Thus, the temperatures necessary for this purpose can be reduced down to 500° C., which is several 100° below the actual temperatures required.

Thus, sintering and titanium aluminide formation can be carried out at a temperature of only about 500° C.

Sintering-active powders of this type which are suitable for this purpose are described in DE 44 18 598 A1 and DE 197 22 416 A1.

However, sintering-active powders of this type can also be obtained by modified grinding methods or coating methods. The powders to be used are advantageously subjected to a high-energy grinding process, in which the elements of the powder or powder mixture adopt the form of fine lamellae and phase formations should be avoided.

However, a powder or powder mixture of this type can also be applied directly to surfaces of a porous basic body without carrying out the preparation of a suspension/dispersion, and the intermetallic phases or mixed crystals can be formed during the heat treatment, without the need for drying.

In this case, but also in other cases, a change in the surface energy or interfacial tension may be favorable. This can be achieved, for example, by physico-chemical processes known per se. If powders are applied alone, electrostatic charging, for example of the basic body, may be advantageous.

The interfacial tension between the surface of the basic body can be influenced, for example, by means of a suitable agent, which can be added to the suspension/dispersion. This can be, for example, a surfactant, with which the wettability can be improved.

Thus, in particular, intermetallic phases can be formed with aluminum or silicon powder if a metallic porous basic body; for example of nickel or molybdenum, is used. However, the basic body can also be formed from other metals which correspond to the suitable powders mentioned above.

However, it is also possible to apply mixtures of powders of this type which are at least two different elements, preferably by means of a suspension/dispersion, and which form intermetallic phases or mixed crystals.

The starting powders should be finely ground, wherever possible under inert ambient conditions (for example argon), so that the mean particle size (d50) is less than 0.15 mm, preferably less than 0.05 mm. Use is preferably made for this purpose of a high-energy grinding process which excludes extensive phase formation during the grinding.

The suspension/dispersion essentially formed from water and comprising sintering/active powders or powder mixtures prepared in this way can then be applied to the porous basic body, which can be carried out by dipping, spraying, or by means of pressure support. In the latter case, the suspension/dispersion can be pressed into the porous basic body or sucked through it. The suspension/dispersion may additionally also comprise organic binders.

The density and porosity of the finished body can be influenced, in particular, through the type and manner of powder application. It is possible to set gradients of these parameters in which different densities, pore sizes and/or porosities occur at the surface, in the region close to the surface and in the interior of the bodies.

Thus, for example, the pores of the basic body can be filled at least partially with a powder or powder mixture, and the intermetallic phase or mixed crystals can subsequently be formed.

It is then also possible for porous particles which increase the specific surface area to be formed in the pores.

The adhesion of a powder or powder mixture can be improved for application to a porous basic body. This enables losses to be reduced.

There are various possibilities for this purpose. Thus, magnetization can be carried out with the aid of correspondingly suitable permanent magnets or also electromagnets. Magnetization of this type can be carried out here on a porous basic body whose material has ferromagnetic properties, as is the case, for example, in a porous basic body made of nickel. However, magnetization of a powder or powder mixture can in the same form also result in the same effect, with at least one constituent in the powder having ferromagnetic properties of this type in this case.

It is of course possible for both basic bodies and powders to be magnetized correspondingly, enabling an additionally increased attractive force and correspondingly improved adhesion of the powder to be ensured before the sintering.

However, electrostatic charging can also be carried out in similar form, which in turn can likewise be achieved merely on the basic body or the powder or powder mixture or on both with opposite polarity. However, electrostatic charging can also be carried out on porous basic bodies, powders or powder mixtures, with in this case no requirements regarding ferromagnetic properties being made, but instead it even being possible for porous basic bodies made from organic materials to be electrostatically charged in a corresponding manner.

However, the elements forming intermetallic phases or mixed crystals can also be applied to a porous basic body as temporary liquid phase and the intermetallic phases or mixed crystals can be formed by heat treatment. The formation of liquid phases is also possible for a short time during sintering. Thus, for example, aluminum is in molten form at a temperature of only about 660° C. and can thus form nickel aluminide with nickel.

A powder mixture can comprise at least two elements having melting points which differ by up to about 500° K. from one another, i.e. an element of relatively low melting point and an element of relatively high melting point. Intermetallic phases or mixed crystals can only be formed here by the element having the relatively low melting point, where appropriate during passage through a temporary liquid phase, and the element having the relatively high melting point can merely be sintered.

The invention will be explained in greater detail below with reference to examples.

EXAMPLE 1

A mixture of nickel powder and aluminum powder in the atomic ratio 50:50, having a mean particle size d50 of <0.05 mm, was finely ground and mixed in a Fritsch planetary ball mill for 2 hours at a speed of 200 $min^{-1}$ in an argon atmosphere. However, no significant phase-formation processes occurred.

A suspension/dispersion of water with 3% by weight of polyvinylpyrrolidone as organic binder was prepared using the powder mixture prepared in this way. A binder/solids ratio of 3:100 was set in the dispersion.

A porous body of nickel, as commercially available from INCO, was impregnated with the suspension by dipping and subsequently dried, and the binder was removed by heating to a temperature of about 400° C.

The heat treatment for the formation of nickel aluminide as intermetallic phase on the surface of the nickel basic body was carried out at 1000° C. under argon for a period of 1 hour.

EXAMPLE 2

In this example, a porous PUR basic body was dipped into a suspension in accordance with Example 1, subsequently dried and then subjected to two-stage heat treatment.

In a first stage, the organic constituents were removed at a temperature of about 450° C. This was carried out over a period of 30 minutes.

An adequate green strength was already achieved in this stage.

In the second stage of the heat treatment, the temperature was increased to 1030° C. and work was carried out in a hydrogen atmosphere. After a period of 1 hour, the porous body formed exclusively from nickel aluminide was cooled.

EXAMPLE 3

The suspension used here and the porous basic body correspond to Example 1.

The suspension was merely sprayed on all sides onto the surface of the porous basic body consisting of nickel using so-called wet powder spraying.

The heat treatment was likewise carried out analogously to Example 1.

What is claimed is:

1. A process for the production of a sintered porous body comprising applying at least one sintering-active powder which forms an intermetallic phase or mixed crystals to the surface of a porous basic body, heat treating the porous basic body and forming the intermetallic phases or mixed crystals which increase the specific surface area during the heat treatment.

2. A process as claimed in claim 1, wherein the mixed crystals or intermetallic phases are formed with elements present in the powder.

3. A process as claimed in claim 1, wherein the mixed crystals or intermetallic phases are formed from the powder and the basic body material.

4. A process as claimed in claim 1 wherein the mixed crystals or intermetallic phases are formed in areas on the surface of the basic body.

5. A process as claimed in claim 1 wherein a powders is selected from the group consisting of nickel, iron, titanium, cobalt, copper, aluminum, silicon, molybdenum, tungsten, chromium, tantalum, niobium, tin, zinc and bismuth, as well as powder mixtures of these elements.

6. A process as claimed in claim 1 wherein a powders having a particle sizes of less than 0.15 mm is used.

7. A process as claimed in claim 1 wherein a nickel/aluminum powder mixture is used.

8. A process as claimed in claim 7, wherein nickel and aluminum are each employed in the same atomic ratio.

9. A process as claimed in claim 7 wherein nickel aluminide is formed on a porous nickel basic body which forms a ductile core.

10. A process as claimed in claim 1 wherein the powders is finely ground in an inert atmosphere.

11. A process as claimed in claim 1 wherein a powder obtained using a high-energy grinding process while avoiding phase formation and in which the elements are in the form of fine lamellae are used.

12. A process as claimed in claim 1 wherein the pores of the basic body are at least partially filled with the powder before the formation of intermetallic phases or mixed crystals.

13. A process as claimed in claim 1 wherein a powder mixture with at least one element of relatively high melting point and at least one element of relatively low melting point is used.

14. A process as claimed in claim 13, wherein at least the element having a relatively low melting point forms intermetallic phases or mixed crystals with the basic body material.

15. A process as claimed in claim 14, wherein the intermetallic phase or mixed crystals are formed after formation of a temporary liquid phase of the element having a relatively low melting point.

16. A process as claimed in claim 1 wherein porous particles are formed in the pores of the basic body in order to increase the specific surface area.

17. A process as claimed in claim 1 wherein the heat treatment is carried out at a sintering temperature which is suitable for the powder or powder mixture employed.

18. A process as claimed in claim 1 wherein the powder or powder mixture is applied to the porous basic body in a suspension/dispersion and drying is carried out before the heat treatment.

19. A process as claimed in claim 18 wherein the surface energy or interfacial tension is changed by means of a physico-chemical method and/or a substance present in the suspension/dispersion before or during application of the suspension/dispersion.

20. A process as claimed in claim 18 wherein the intermetallic phases or mixed crystals are formed exclusively from the powder components present in the suspension/dispersion.

21. A process as claimed in claim 18 wherein the powder, powder mixture or suspension/dispersion is applied by dipping, spraying or with pressure support.

22. A process as claimed in claim 1 wherein a porous basic body made of a metal is used.

23. A process as claimed in claim 22, wherein a porous basic body made of nickel is used.

24. A process as claimed in claim 1 wherein a porous basic body made of a porous plastic is used.

25. A process as claimed in claim 1 wherein organic components are expelled by means of a heat treatment with a maximum temperature of 750° C. before formation of the intermetallic phases or mixed crystals.

26. A process as claimed in claim 1 wherein a suspension/dispersion comprising organic and/or inorganic binder is used.

27. A process as claimed in claim 1 wherein the powder or powder mixture and/or the porous basic body is/are magnetized before the application and sintering.

28. A process as claimed in claim 1 wherein the powder or powder mixture and/or the porous basic body is/are electrostatically charged before the application and sintering.

29. A sintered porous body wherein the body is produced by sintering at least one active powder which forms an intermetallic phase or mixed crystals on the surface of a porous body, heat treating the porous body to form intermetallic phases or mixed crystals which increase the specific surface area where the intermetallic phases or mixed crystals are formed from at least two elements selected from the group consisting of nickel, iron, titanium, cobalt, copper, aluminum, silicon, molybdenum and tungsten.

30. A body as claimed in claim 29, wherein the intermetallic phase is selected from the group consisting of aluminides and silicides.

31. A body as claimed in claim 29 wherein a surface coating which increases the specific surface area has been formed on a porous core.

32. A body as claimed in claim 29 wherein a surface coating has been formed from the group consisting of nickel aluminide and molybdenum suicide.

33. A body as claimed in claim 29 wherein an element acting as catalyst has been adducted on the surface.

34. A body as claimed in claim 29 wherein SiC, $ZrO_2$, $Al_2O_3$, $MgO_2$ and/or $TiB_2$ are present as reinforcing components.

35. A body as claimed in claim 29 wherein a density and/or porosity gradient is present from the outside inward.

36. A body as claimed in claim 29 which has been formed from a metallic porous basic body provided with a surface coating formed from intermetallic phases or mixed crystals.

37. A body as claimed in claim 36, wherein the basic body has been formed from an element selected from the group consisting of nickel, iron, titanium, cobalt, aluminum, silicon, molybdenum and tungsten.

38. A body as claimed in claim 29 wherein the body is a filter or catalyst support.

* * * * *